（12）United States Patent
Kubota et al.

(10) Patent No.: US 10,608,286 B2
(45) Date of Patent: Mar. 31, 2020

(54) SECONDARY CELL

(71) Applicant: Hitachi Automotive Systems, Ltd., Hitachinaka-shi, Ibaraki (JP)

(72) Inventors: Osamu Kubota, Tokyo (JP); Masaaki Iwasa, Hitachinaka (JP); Hitoshi Nishimori, Hitachinaka (JP); Akihide Tanaka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 186 days.

(21) Appl. No.: 15/743,016

(22) PCT Filed: Jul. 13, 2016

(86) PCT No.: PCT/JP2016/070622
§ 371 (c)(1),
(2) Date: Jan. 9, 2018

(87) PCT Pub. No.: WO2017/014118
PCT Pub. Date: Jan. 26, 2017

(65) Prior Publication Data
US 2018/0219262 A1 Aug. 2, 2018

(30) Foreign Application Priority Data
Jul. 23, 2015 (JP) .................................. 2015-145401

(51) Int. Cl.
*H01M 10/0587* (2010.01)
*H01M 10/0585* (2010.01)
(Continued)

(52) U.S. Cl.
CPC ..... *H01M 10/0587* (2013.01); *H01M 2/0237* (2013.01); *H01M 2/04* (2013.01);
(Continued)

(58) Field of Classification Search
CPC .. H01M 10/0431; H01M 2/02; H01M 2/0217; H01M 10/0525; H01M 10/0585;
(Continued)

(56) References Cited

U.S. PATENT DOCUMENTS

| 5,916,707 | A | 6/1999 | Omaru et al. |
| 6,232,015 | B1 | 5/2001 | Wyser |

(Continued)

FOREIGN PATENT DOCUMENTS

| CN | 102005602 A | 4/2011 |
| CN | 102024917 A | 4/2011 |

(Continued)

OTHER PUBLICATIONS

Extended European Search Report issued in counterpart European Application No. 16827678.0 dated Jan. 25, 2019 (10 pages).
(Continued)

*Primary Examiner* — Carlos Barcena
(74) *Attorney, Agent, or Firm* — Crowell & Moring LLP

(57) ABSTRACT

Provided is a secondary cell which is resistant to vibration and impact. The secondary cell includes a flat wound group supported, through an insulator, at a lid on which external terminals are arranged, and a cell case for housing the flat wound group. In the secondary cell, a flat portion of the flat wound group has a gap between the flat portion and a wide surface of the cell case, and is held on the wide surface near a cell case bottom through a holding portion.

10 Claims, 17 Drawing Sheets

(51) Int. Cl.
*H01M 10/0525* (2010.01)
*H01M 2/04* (2006.01)
*H01M 2/10* (2006.01)
*H01M 4/38* (2006.01)
*H01M 4/36* (2006.01)
*H01M 4/485* (2010.01)
*H01M 4/66* (2006.01)
*H01M 2/14* (2006.01)
*H01M 2/18* (2006.01)
*H01M 10/04* (2006.01)
*H01M 2/02* (2006.01)
*H01M 2/16* (2006.01)
*H01M 4/02* (2006.01)

(52) U.S. Cl.
CPC ............ *H01M 2/043* (2013.01); *H01M 2/10* (2013.01); *H01M 2/1072* (2013.01); *H01M 2/14* (2013.01); *H01M 2/18* (2013.01); *H01M 4/364* (2013.01); *H01M 4/366* (2013.01); *H01M 10/0431* (2013.01); *H01M 2/16* (2013.01); *H01M 4/382* (2013.01); *H01M 4/485* (2013.01); *H01M 4/662* (2013.01); *H01M 10/0525* (2013.01); *H01M 10/0585* (2013.01); *H01M 2004/027* (2013.01); *H01M 2004/028* (2013.01)

(58) Field of Classification Search
CPC ....... H01M 10/0587; H01M 2004/027; H01M 2004/028; H01M 2/0237; H01M 2/04; H01M 2/043; H01M 2/10; H01M 2/1072; H01M 2/14; H01M 2/16; H01M 2/18; H01M 4/364; H01M 4/366; H01M 4/382; H01M 4/485; H01M 4/662
See application file for complete search history.

(56) References Cited

U.S. PATENT DOCUMENTS

| | | | |
|---|---|---|---|
| 2006/0099504 A1 | 5/2006 | Kim | |
| 2007/0196729 A1 | 8/2007 | Yamauchi et al. | |
| 2011/0052975 A1* | 3/2011 | Lee | H01M 2/0237 429/178 |
| 2011/0070471 A1 | 3/2011 | Cho | |
| 2011/0236750 A1* | 9/2011 | Kohno | H01M 2/0404 429/181 |
| 2011/0311851 A1 | 12/2011 | Shinoda et al. | |
| 2012/0301759 A1* | 11/2012 | Yoshitake | H01M 2/0237 429/94 |
| 2013/0101877 A1 | 4/2013 | Kohno | |
| 2015/0093620 A1* | 4/2015 | Miyazaki | H01M 2/02 429/94 |

FOREIGN PATENT DOCUMENTS

| | | |
|---|---|---|
| CN | 102290550 A | 12/2011 |
| EP | 2 398 088 A2 | 12/2011 |
| EP | 2 458 659 A1 | 5/2012 |
| EP | 2 808 925 A1 | 12/2014 |
| JP | 9-199089 A | 7/1997 |
| JP | 2000-67821 A | 3/2000 |
| JP | 3709628 B2 | 10/2005 |
| JP | 2006-93100 A | 4/2006 |
| JP | 2010-287456 A | 12/2010 |
| JP | 2012-4079 A | 1/2012 |
| JP | 2012-227110 A | 11/2012 |
| JP | 2013-168283 A | 8/2013 |
| JP | 2015-69725 A | 4/2015 |
| JP | 5752836 B2 | 7/2015 |
| WO | WO 2014/002647 A1 | 1/2014 |

OTHER PUBLICATIONS

International Search Report (PCT/ISA/210) issued in PCT Application No. PCT/JP2016/070622 dated Oct. 4, 2016 with English translation (Four (4) pages).

Japanese-language Written Opinion (PCT/ISA/237) issued in PCT Application No. PCT/JP2016/070622 dated Oct. 4, 2016 (Four (4) pages).

Japanese-language Office Action issued in counterpart Japanese Application No. 2015-145401 dated Feb. 5, 2019 with English translation (five (5) pages).

Japanese-language Office Action issued in counterpart Japanese Application No. 2015-145401 dated Dec. 18, 2018 with English translation (seven (7) pages).

Chinese-language Office Action issued in counterpart Chinese Application No. 201680027343.4 dated Nov. 4, 2019 (13 pages).

* cited by examiner

SECONDARY CELL

TECHNICAL FIELD

The present invention relates to a secondary cell having a flat wound group housed in a cell case.

BACKGROUND ART

In recent years, secondary cells, such as lithium ion secondary cells, of high energy density have been developed as power for electric vehicles and the like. Such secondary cells include a secondary cell configured to house, in a cell case, a flat wound group connected to a current collector member for positive electrode and a current collector member for negative electrode which are arranged at external terminals provided at a case lid.

In order to fix a flat wound group or prevent expansion and contraction of a flat wound group due to charge and discharge, such a secondary cell is configured so that a flat wound group is fixed using an inner wall of a cell case. In some cases, a cell is held from outside by a securing member or the like.

However, in the secondary cell in which the wound group is secured, expansion and contraction of the wound group due to charge and discharge causes discharge of an electrolyte from the wound group (electrolyte depletion). Electrolyte depletion causes reduction in ionic conductance, so that in general, the electrolyte depletion contributes to increase in resistance. In particular, in a secondary cell, such as a lithium ion secondary cell, of high energy density, an electrode has a thick coating and a large current density, and thus, reduction in ionic conductivity in an electrode, caused by such electrolyte depletion, is expected to have a significant influence on increase of DCR. Accordingly, for such a secondary cell, a structure is expected to hold a flat wound group moderately as much as possible.

However, in a secondary cell having such a configuration, a flat wound group being a heavy object is housed in a cell case while being almost suspended from above, so that the flat wound group needs to be held in some way to avoid the risk of breakage of a connection between the flat wound group and a current collector member for positive electrode or a current collector member for negative electrode, due to movement of the flat wound group when vibration or impact is applied to the cell.

PTL 1 discloses a technology about a power storage device having a spacer capable of being arranged on a curved surface of an electrode body to avoid scratch on the electrode body, although its object is different.

CITATION LIST

Patent Literature

PTL 1: JP 2013-168283 A

SUMMARY OF INVENTION

Technical Problem

However, only use of a spacer along a curved surface portion, as in PTL 1, is not always sufficient against vibration or impact. Furthermore, in a secondary cell described in PTL 1, since a wound group is held by a holding portion, along the shape of a curved portion of the wound group, the holding portion is required to be formed to a close dimensional tolerance so that the holding portion is used to be precisely positioned along the shape of the curved portion of the wound group.

An object of the present invention is to provide a structure which reduces vibration of a wound group with a simple structure, in a structure in which the wound group is not secured to prevent electrolyte depletion.

Solution to Problem

For example, the followings are provided.

A secondary cell including a flat wound group including a flat portion, a cell case, and a case lid for sealing the cell case, the flat wound group being housed in the cell case, and the lid supporting the flat wound group on one end side of the flat wound group, in which the secondary cell has a gap between the flat portion and the cell case, and a holding portion between a flat portion on the other end side of the flat wound group and the cell case.

A secondary cell including a flat wound group including a flat portion; a cell case, and a lid for sealing the cell case, the flat wound group being housed in the cell case, the lid supporting the flat wound group on one end side of the flat wound group, in which the secondary cell has a holding portion between a flat portion on the other end side of the flat wound group and the cell case, and an opposing surface opposing the flat portion has a portion positioned outside the wound body in a thickness direction relative to a contact portion between the holding portion and the flat portion.

Advantageous Effects of Invention

According to the present invention, a structure can be provided which reduces vibration of a wound group with a simple structure, in a structure in which the wound group is not secured to prevent electrolyte depletion.

DESCRIPTION OF EMBODIMENTS

Hereinafter, specific examples of the best mode for carrying out the present invention will be described with reference to the drawings, but the present invention is not limited to the examples, and other modes conceivable within the spirit and scope of the present invention also fall within the spirit and scope of the present invention. Furthermore, the figures in the examples are diagrams, and are not intended to ensure accuracy in positional relationships, dimensions, or the like in the figures. Various changes and modifications may be made by a person skilled in the art, without departing from the spirit and scope disclosed in the present description. Furthermore, in all figures for description of the present invention, components having the same functions are denoted by the same reference signs, and repeated description thereof will be sometimes omitted.

FIRST EXAMPLE

Figure 1:
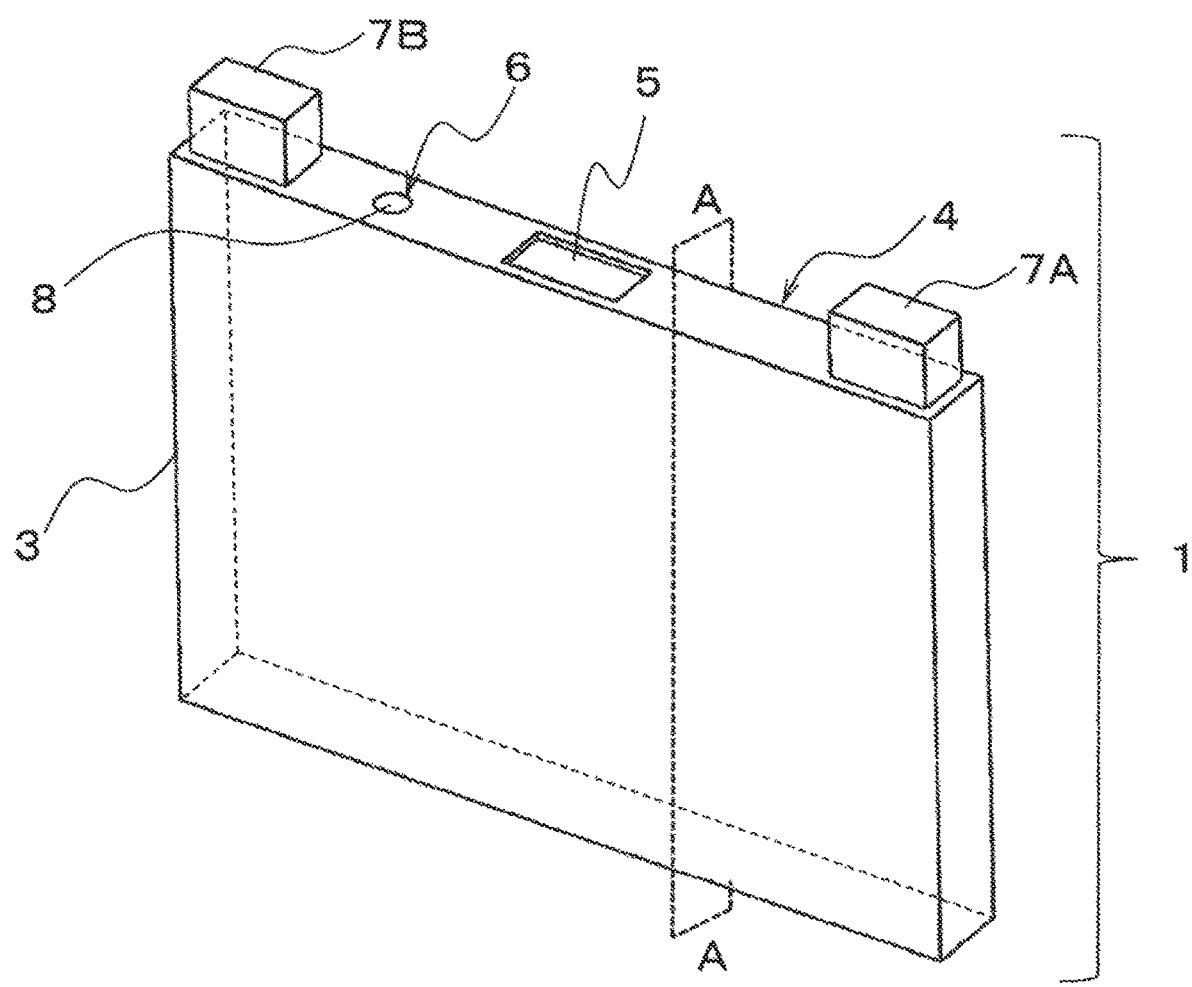
FIG. 1 is a conceptual schematic diagram illustrating a secondary cell 1 according to the present embodiment.

A configuration of a secondary cell 1 according to the present embodiment is illustrated in FIG. 1. The secondary cell 1 includes a power generation element (not illustrated) wound around an insulating sheet 2, and the power generation element is housed in a square flat cell case 3 made of metal such as aluminum or aluminum alloy. The secondary cell includes a case lid 4 including a gas discharge valve 5, a solution inlet 6, and a terminal connection portion 7. The gas discharge valve 5 is configured to be released by pressure less than a burst pressure of the cell case, and when a pressure in the cell suddenly rises due to thermal runaway caused by short circuit, overcharge, or the like, the gas release valve 5 is released to prevent burst of the cell case. The solution inlet 6 is used for pouring of an electrolyte, and sealed by a metal cap 8 through laser welding, after pouring the electrolyte. The terminal connection portion 7 (positive electrode current collector 7A, negative electrode external terminal 7B) is a portion corresponding to a most upstream side for drawing a load from the secondary cell.

Figure 2:
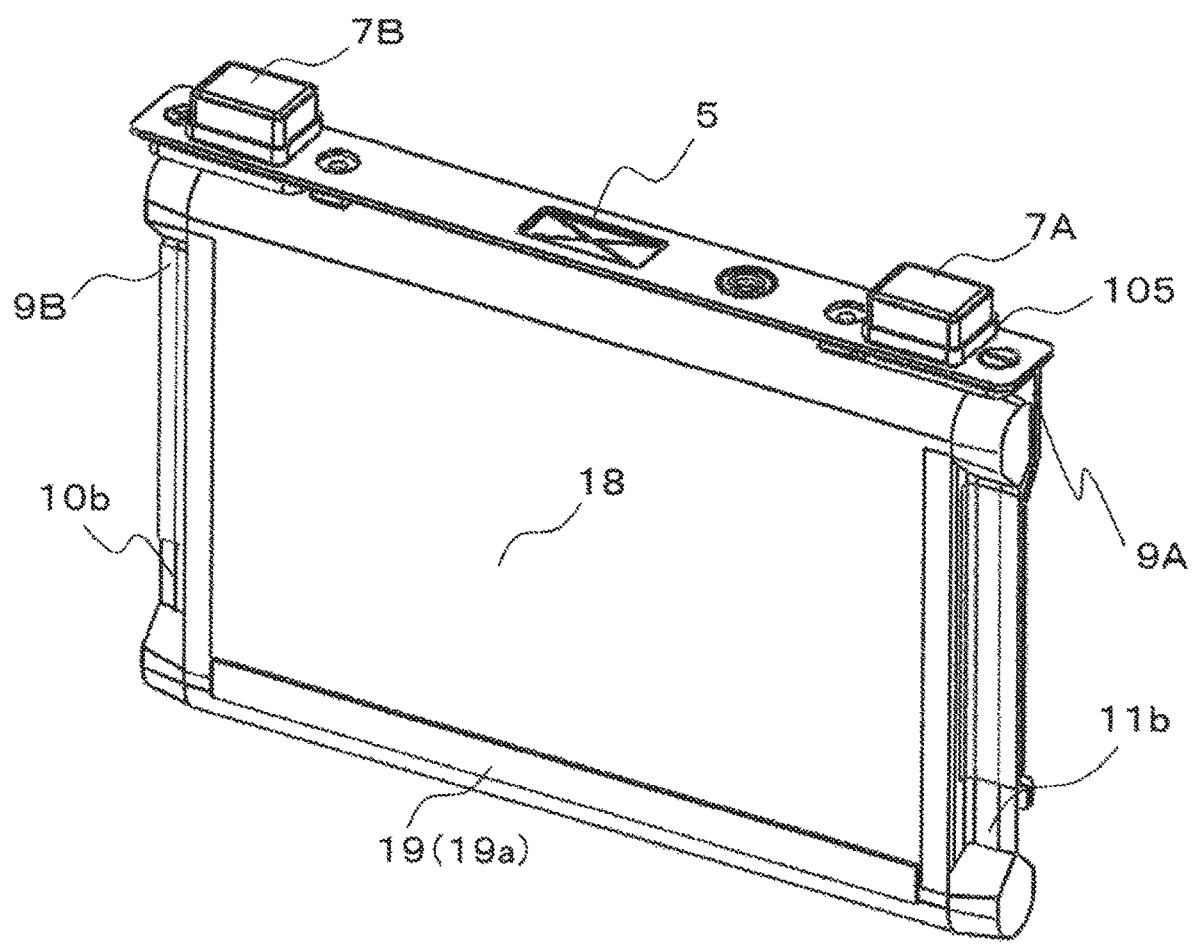
FIG. 2 is an exploded perspective view of a secondary cell having a square shape.

FIG. 2 is an exploded perspective view of the secondary cell having a square shape (structure excluding the cell case 3 in FIG. 1).

The cell case 3 houses a flat wound group 18 through the insulating sheet 2 (not illustrated).

The flat wound group 18 has a positive electrode foil exposed portion 11b electrically connected to the positive electrode external terminal 7A provided at the case lid 4 through a positive electrode current collector (current collector terminal) 9A. Furthermore, the flat wound group 18 has a negative electrode unapplied portion 10b electrically connected to the negative electrode external terminal 7B provided at the case lid 4, through a negative electrode current collector (current collector terminal) 9B. Therefore, power is supplied from the flat wound group 18 to an external load through the positive electrode current collector 9A and the negative electrode current collector 9B, and the flat wound group 18 is charged with externally generated power supplied through the positive electrode current collector 9A and the negative electrode current collector 9B.

For electrical insulation of the positive electrode current collector 9A and the negative electrode current collector 9B, and the positive electrode external terminal 7A and the negative electrode external terminal 7B, from the case lid 4, a gasket 105 and an insulating plate are provided under the case lid 4 (not illustrated). Furthermore, after an electrolyte is poured into the cell case 3 from the solution inlet 7, a solution inlet plug is joined to the case lid 4 by laser welding to seal the solution inlet 7, and the secondary cell 1 is closed.

Here, a material of the positive electrode external terminal 7A and the positive electrode current collector 9A includes for example an aluminum alloy, and a material of the negative electrode external terminal 7B and the negative electrode current collector 9B includes for example a copper alloy. Furthermore, a material of the insulating plate and the gasket 105 includes an insulating resin material, such as polybutylene terephthalate, polyphenylene sulfide, or perfluoroalkoxy fluorocarbon resin.

Furthermore, a solution inlet 9 is bored in the case lid 4 to pour an electrolyte in the cell container, and the solution inlet 9 is sealed by the solution inlet plug after an electrolyte is poured into the cell container. Here, as an electrolyte poured into the cell container, for example, a nonaqueous electrolyte can be applied which is obtained by dissolving a lithium salt, such as lithium hexafluorophosphate ($LiPF_6$), in a carbonate-based organic solvent, such as ethylene carbonate.

Each of the positive electrode external terminal 7A and the negative electrode external terminal 7B has a weld-connecting portion connected to a bus bar or the like by welding. The weld-connecting portion has a cuboid block shape projecting upward from the case lid 4, and is configured to have a lower surface opposing a surface of the case lid 4, and an upper surface parallel with the case lid 4 at a predetermined height position.

The positive electrode current collector 9A and the negative electrode current collector 9B are respectively bent at a positive electrode current collector base portion and a negative electrode current collector base portion each having a rectangular plate shape and arranged opposite to a lower surface of the case lid 4, and on side ends of the positive electrode current collector base portion and the negative electrode current collector base portion, extend toward a bottom surface along a wide surface of the cell case 3, and connected to be oppositely superposed on the positive electrode foil exposed portion 11b and the negative electrode unapplied portion 10b of the flat wound group 18.

The flat wound group 18 has a flat portion 17 provided with holding portions 19 at a lower portion of the flat portion 17. Each of the holding portions 19 is provided between the flat wound group 18 and an inner wall of the cell case 3. The holding portion 19 projects toward the flat portion 17 of the flat wound group 18, and thus, even when a gap is provided between the flat portion 17 of the flat wound group 18 and the cell case 3, the flat wound group 18 is fixed by the holding portions 19, and thus bad influence on the flat wound group 18 due to vibration can be reduced. In a first example, an insulating tape is used as the holding portion 19. The insulating tape can include, for example, polypropylene. Other than the insulating sheet, a sheet-shaped member or the like may be fixed with an adhesive or the like. The insulating sheet or the sheet-shaped member may be fixed to the flat wound group 18 or on the inner wall of the cell case 3, as illustrated in the figure.

The insulating tape as the holding portion 19 is provided on application portions of a positive electrode material mixture layer and a negative electrode material mixture (positive electrode applied portion 11*a*, negative electrode applied portion 11*b*). Even when the insulating tape is provided on the negative electrode unapplied portion 10*b* and the positive electrode unapplied portion 11*b*, flat wound group 18 is ineffectively fixed.

Although not illustrated in FIG. 2, and the insulating sheet 2 is wound around the flat wound group 18, in a direction along a flat surface of the flat wound group 18, and orthogonal to a winding axis direction of the flat wound group 18, as an axis direction. The insulating sheet 2 includes, for example, one sheet or a plurality of film members made of a synthetic resin, such as polypropylene (PP), and has a length long enough to be wound around a winding center, that is, in a direction parallel with the flat surface of the flat wound group 18, and orthogonal to the winding axis direction.

Figure 3:
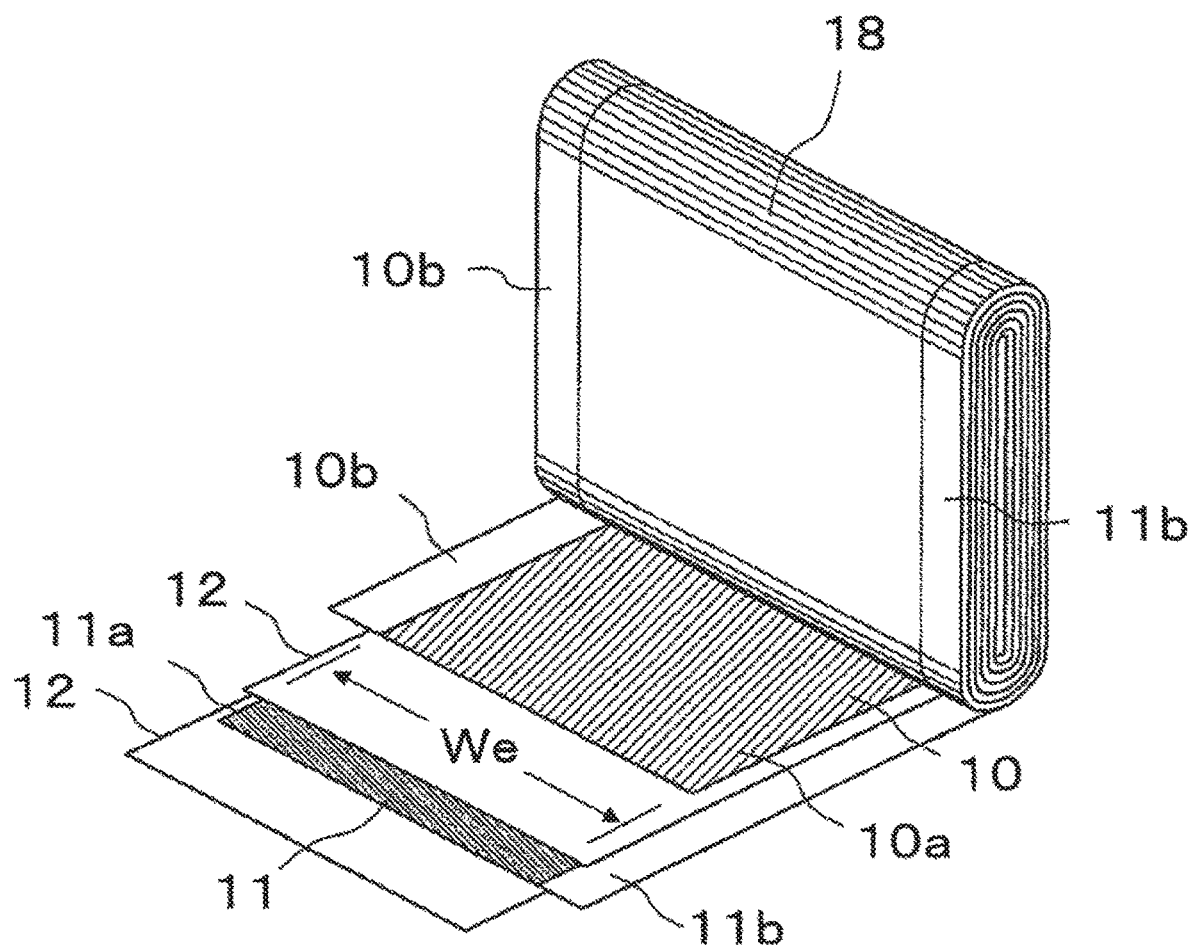
FIG. 3 is an exploded perspective view of a wound electrode body which is partially unwound.

FIG. 3 is an exploded perspective view of a wound electrode body which is partially unwound.

The flat wound group 18 is an electrode body obtained by winding a positive electrode sheet 11 and a negative electrode sheet 10 into a flat shape, through a separator 12. The positive electrode sheet 10 includes the positive electrode applied portion 10*a* to which a positive electrode active material is applied and the positive electrode unapplied portion 10*b* to which no positive electrode active material is applied, and the negative electrode sheet 11 includes the negative electrode applied portion 11*a* to which a negative electrode active material is applied, and the negative electrode unapplied portion 11*b* to which no negative electrode active material is applied. Here, a width of the opposing positive electrode applied portion and negative electrode applied portion is defined as We.

The positive electrode sheet 11 and the negative electrode sheet 10 are wound so that the positive electrode unapplied portion 11*b* and the negative electrode unapplied portion 10*b* on which no positive electrode material mixture and no negative electrode material mixture are applied, respectively, are positioned on both end surfaces of the flat wound group 18 in the winding axis direction.

The positive electrode applied portion 10*a* has a positive electrode active material layer formed by coating a positive electrode active material mixture obtained by mixing a binder with a positive electrode active material, on both sides of a positive electrode foil. Furthermore, the negative electrode sheet 10 has a negative electrode active material layer formed by coating a negative electrode active material mixture obtained by mixing a binder with a negative electrode active material, on both sides of a negative electrode foil. Then, charge and discharge is performed between the positive electrode active material on the positive electrode active material layer, and the negative electrode active material on the negative electrode active material layer.

Here, the positive electrode foil is, for example, an aluminum alloy foil having a thickness of approximately 20 to 30 μm, and the negative electrode foil is a copper alloy foil having a thickness of approximately 15 to 20 μm.

Furthermore, a material of the separator 12 includes, for example, porous polyethylene resin, the positive electrode active material includes a lithium-containing transition metal complex oxide, such as lithium manganese oxide, and the negative electrode active material includes a carbon material, such as graphite, reversibly absorbing and releasing lithium ions.

The flat wound group 18 wound into a flat shape has a pair of curved portions having a semicircular cross-section and opposing each other, and the flat portion 17 formed between the pair of curved portions. One curved portion of the flat wound group 18 is inserted into the cell case 3 so that a winding axis direction is oriented in a horizontal width direction of the cell case 3, and the other curved portion is arranged near an upper opening.

Figure 4:
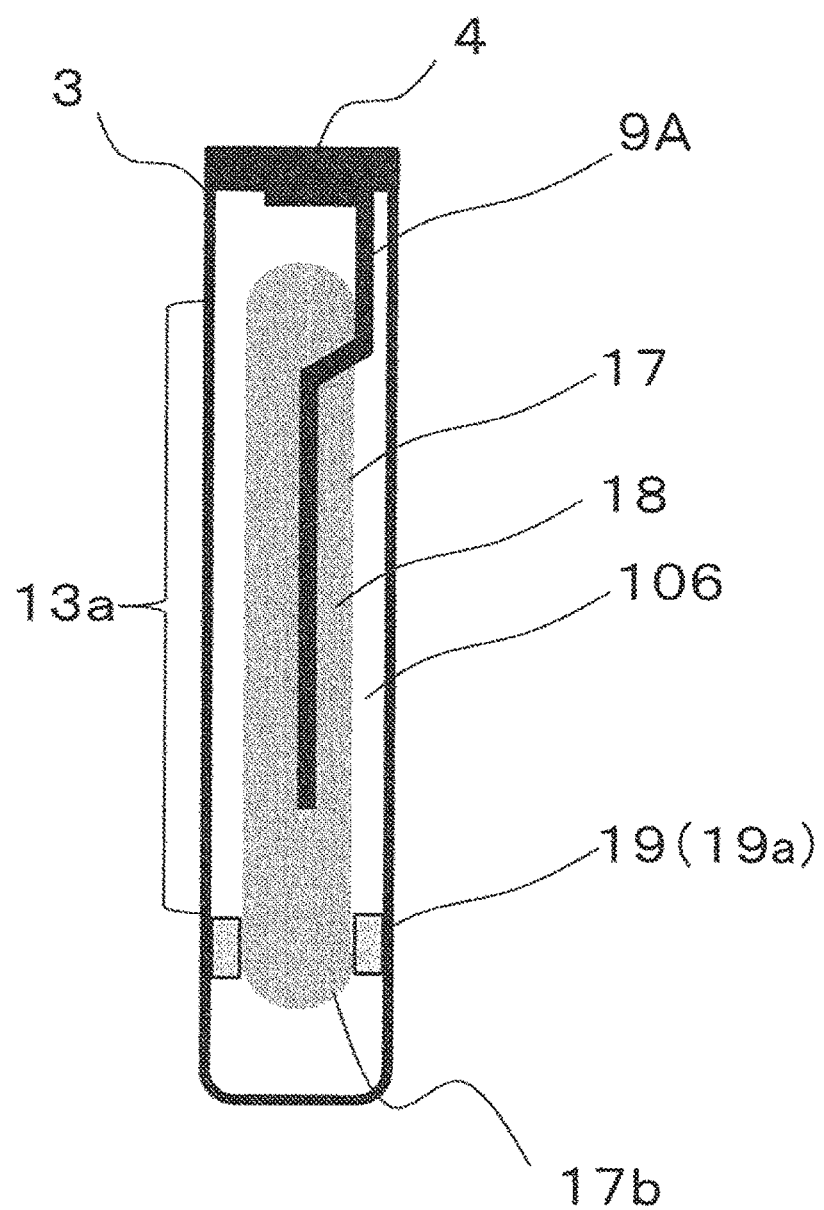
FIG. 4 is a schematic cross-sectional view of FIG. 1 (A-A cross-section).

FIG. 4 is a schematic cross-sectional view of FIG. 1 (A-A cross-section).

The flat wound group 18 is connected to the case lid 4 (negative electrode current collector 9B is not illustrated), through the positive electrode current collector 9A and the negative electrode current collector 9B, and the case lid 4 is structured to support the flat wound group 18 on one end side. Furthermore, gaps 106 are provided between the flat portion 17 of the flat wound group 18, and an inner wall of the cell case 3. An opposing surface 13*a* opposing the flat portion 17 is positioned outside the flat wound group in a thickness direction, relative to a contact portion between the holding portion 19 and the flat portion 17. Therefore, a gap 106 is naturally formed between the flat portion 17 and the inner wall of the cell case 3. Provision of each gap 106 can reduce "electrolyte depletion", that is, discharge of an electrolyte from the wound group which is caused by expansion and contraction of the wound group due to the charge and discharge of the secondary cell. Reduction of electrolyte depletion can inhibit increase in resistance caused by use of the secondary cell.

The holding portion 19 is provided between the other end side of the flat portion 17 of the flat wound group 18 (near the cell case bottom side, i.e., lower side in FIG. 4) and the inner wall of the cell case 3. Without the holding portion 19, the flat wound group 18 being a heavy object is housed in the cell case while being almost suspended from above. Provision of the holding portion 19 can stabilize the flat wound group 18. The holding portion 19 is preferably positioned on the other end side of the flat portion 17 of the flat wound group 18 (near the cell case bottom side, i.e., lower side in FIG. 4), for example, is preferably provided at any position on a lower side of the flat portion 17 (near the cell case bottom). Since the flat wound group 18 is fixed near the case lid by the positive electrode current collector 9A and the negative electrode current collector 9B, to effectively reduce the vibration of the flat wound group 18 the flat wound group 18 needs to be held near the cell case bottom on the other end side relative to the case lid. Here, the gap preferably has a dimension of 100 to 500 μm, and the holding portion 19 (19*a*) preferably has a dimension of 100 to 500 μm in the thickness.

The holding portion 19 is preferably provided on both sides of the flat wound group, as illustrated in FIG. 4. Provision of the holding portion 19 on both sides can reliably fix the flat wound group. Provision of the holding portion 19 only on one side can effectively reduce vibration, in comparison with provision of no holding portion 19, although the flat wound group is insufficiently fixed.

The flat wound group 18 has a curved portion 17*b*, and a gap is preferably also provided between the curved portion 17*b* and the cell case 3. Since the positive electrode material mixture layer and the negative electrode material mixture layer are applied to the curved portion 17b, the curved portion 17b is preferably also provided with a gap to prevent electrolyte depletion caused by expansion and contraction of the wound group and pressing of the wound group.

Figure 5:
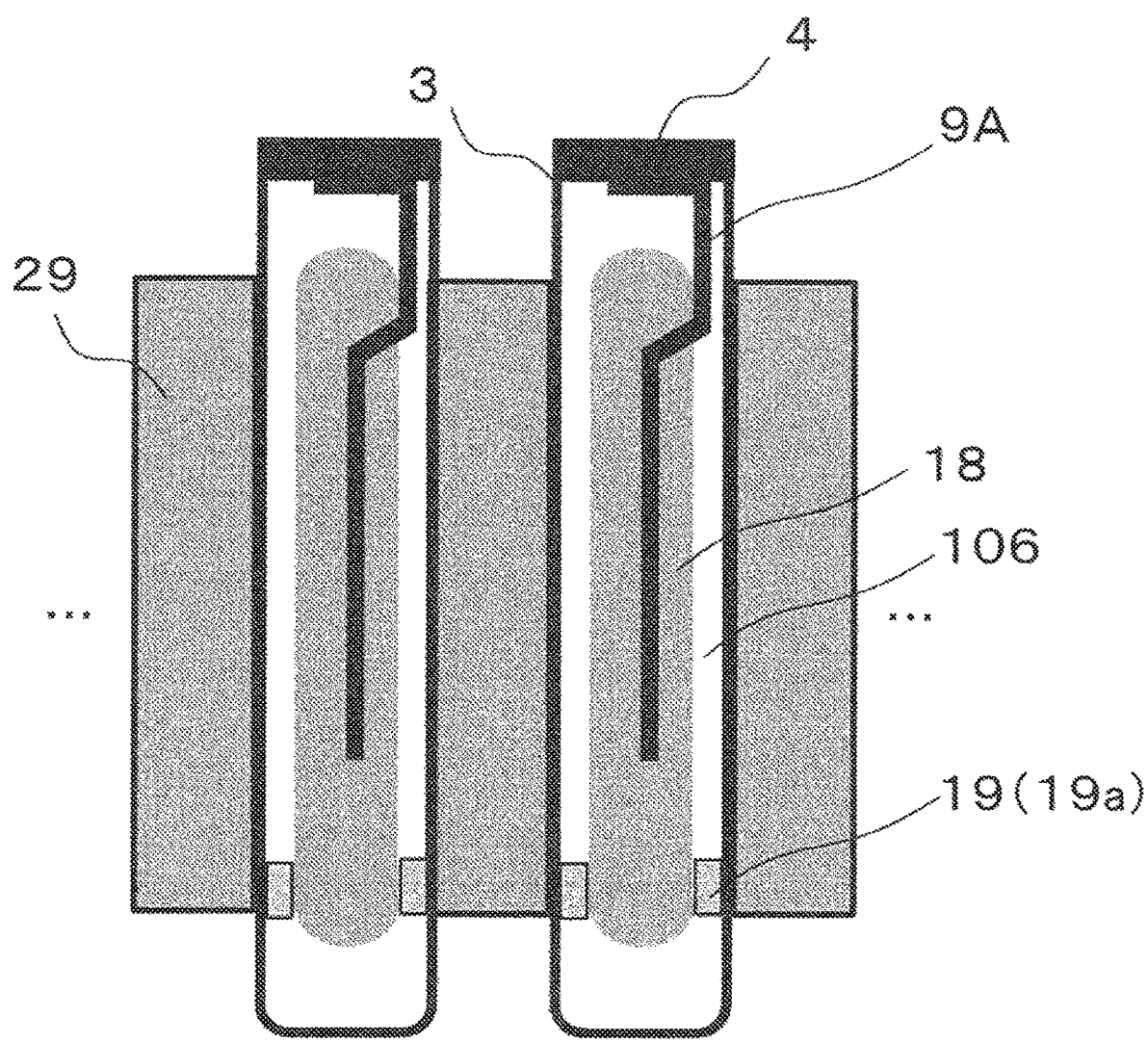
FIG. 5 is a schematic view of a module using a secondary cell 1 according to a first example.

FIG. 5 is a schematic view of a module using the secondary cell 1 according to the first example.

Arrangement of a plurality of secondary cells 1 can form a module. When forming the module, a connector 29 is preferably provided between the secondary cells 1 to fix the secondary cells 1. FIG. 5 is a diagram illustrating a positional relationship between the flat wound groups 18, the holding portions 19, and the connector 29, when the secondary cells 1 are used by being held from outside the cell case by the connector. The connector 29 applies a force, from outside the cell cases 3, to portions of the cell cases 3 opposing the holding portions 16, and the cells are effectively held. The connector 29 may have a shape making contact with a portion of the cell case 3 not opposing the holding portion 19.

Figure 6:
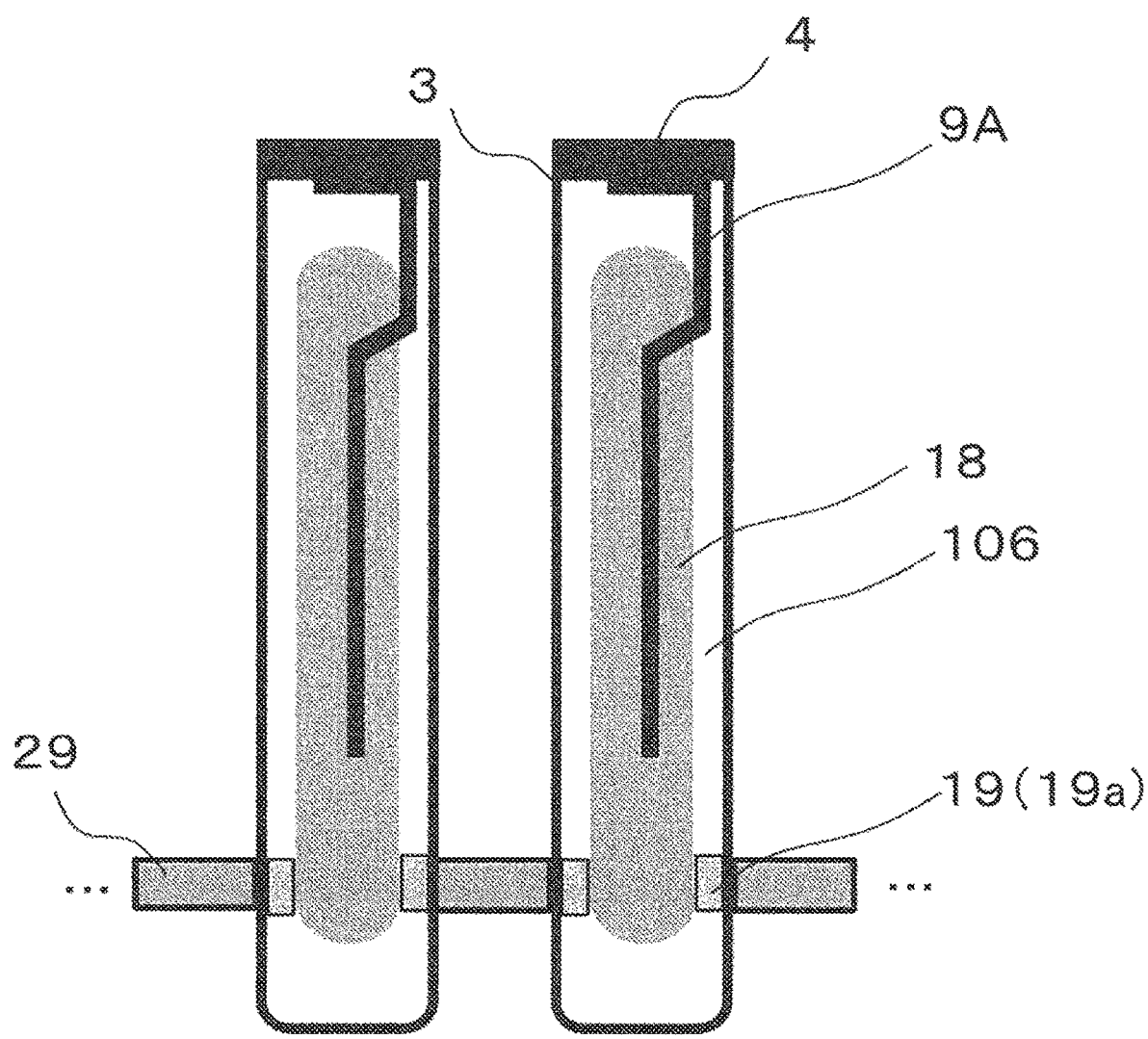
FIG. 6 illustrates another module using the secondary cell 1 according to the first example.

FIG. 6 is a schematic diagram of another module using the secondary cell 1 according to the first example.

The connector 29 may be provided only at a position opposing the holding portion 19 positioned in the secondary cell 1, as illustrate in FIG. 6. Since the connector 29 is provided at positions opposing the holding portions 19 positioned in the secondary cells 1, cooling air can be applied to side surfaces of cell cases not in contact with the connector 29.

SECOND EXAMPLE

Figure 7:
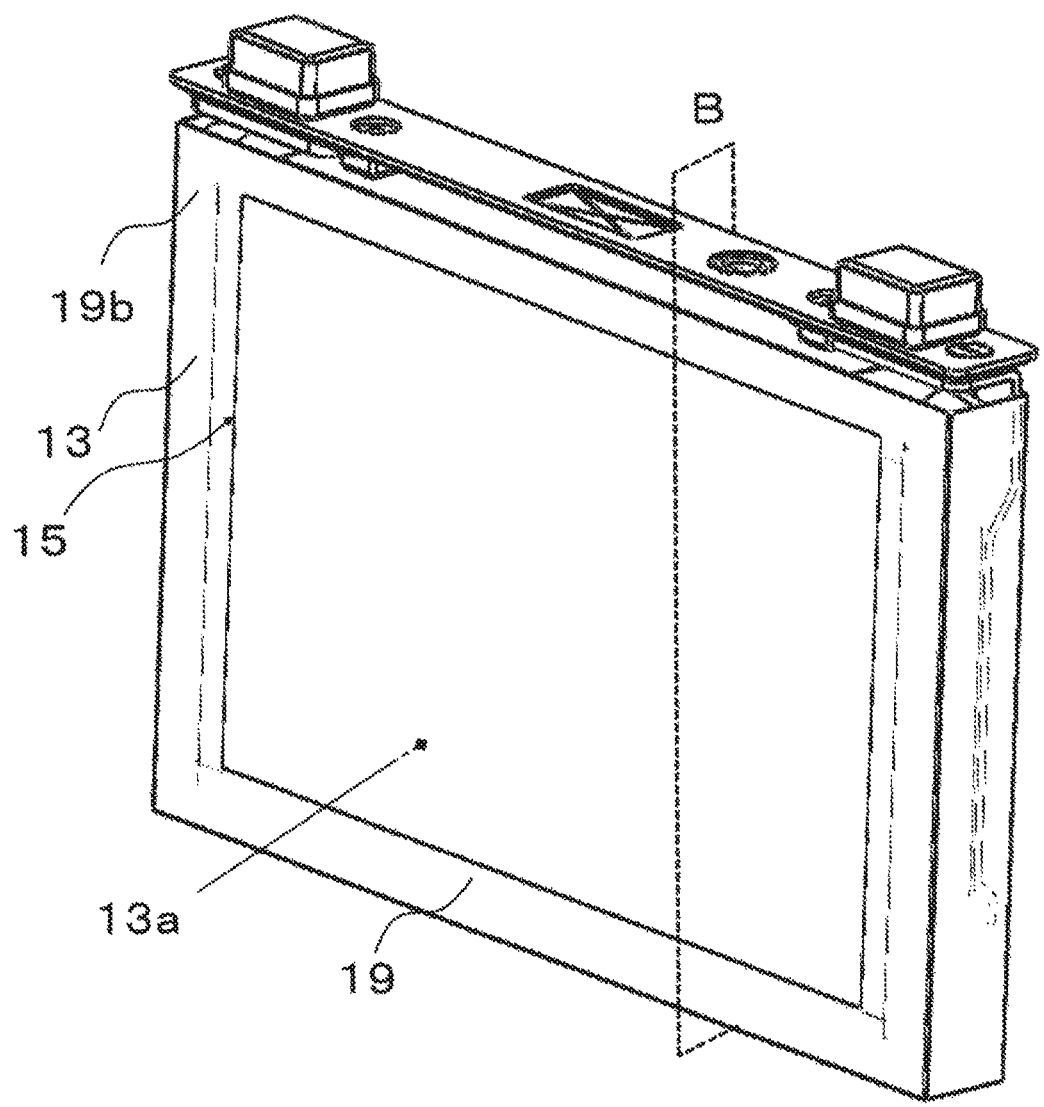
FIG. 7 is an exploded perspective view of a secondary cell 1 according to a second example.

FIG. 7 is an exploded perspective view of the secondary cell 1 according to a second example (cell case 3 is not illustrated).

Although, in the first example, the insulating tape 19a is used as the holding portion 19, in the second example, the shape of the insulating sheet 2 according to the first example is changed to have an insulating sheet 19b having a holding portion, functioning as the holding portion.

The insulating sheet 19b having a holding portion can employ a material similar to that of the insulating sheet 2 according to the first example. The insulating sheet 19b having a holding portion 19 has at least a double structure including outside wide portions 13, and the opposing surfaces 13a opposing the inner wall of the cell case 3. A holding member 19 has a structure in which a plurality of insulating layers constituting the insulating sheet overlaps. Two or more of the insulating layers may be employed.

Figure 8:
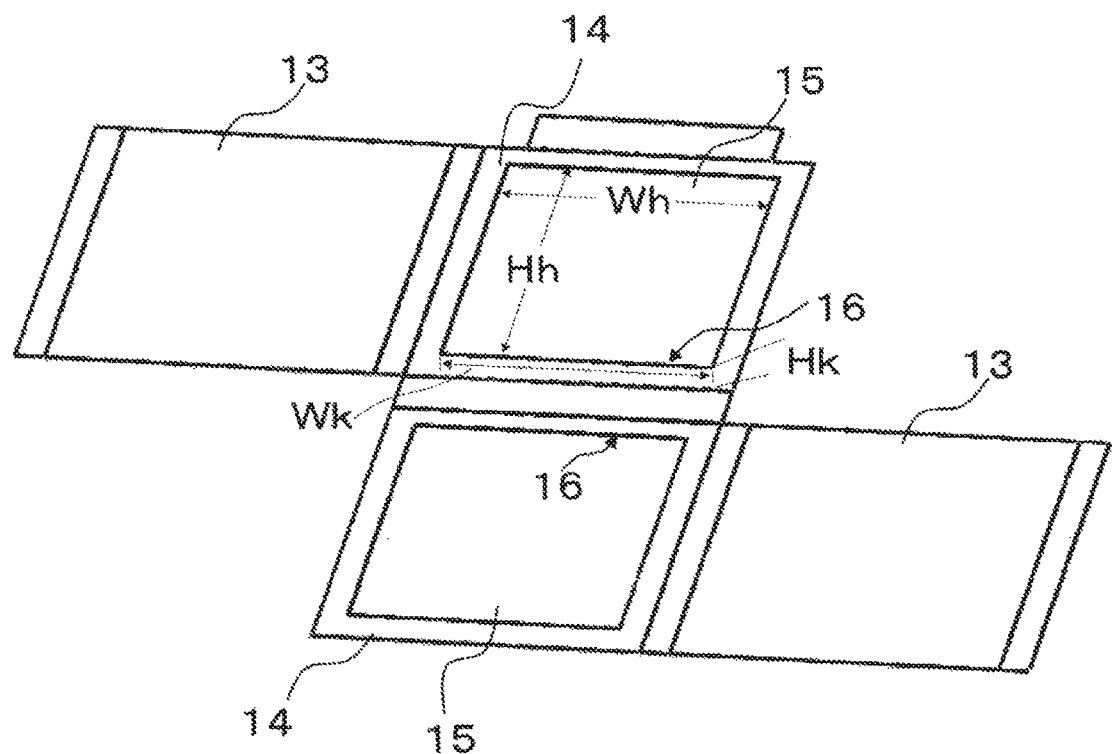
FIG. 8 is an exploded perspective view of an insulating sheet 19b having a holding portion.

Inside wide portions 14 illustrated in FIG. 8 each includes a hole 15, and an area having a gap is generated between the flat portion 17 of the flat wound group 18 and the outside wide portion 13. Here, of a surface of the outside wide portion 13 opposing the flat portion 17 of flat wound group, a portion not making contact with the holding portion 19 is defined as the opposing surface 13a. Note that the opposing surface 13a is not limited to the insulating sheet, and is preferably an opposing surface positioned in a direction away from the flat portion 17 of flat wound group, across a contact between the holding portion 19 and the flat portion 17 of flat wound group.

FIG. 8 is an exploded perspective view of the insulating sheet 19b having the holding portion.

The insulating sheet 19b having a holding portion includes the outside wide portion 13 and the inside wide portion 14. The inside wide portion 14 includes the hole 15 and the portion 16 functioning as the holding portion 19. The hole 15 has a rectangular shape with a width dimension Wh and a height dimension Hh. A relationship Wh>We is established between the width dimension Wh and the width We of the opposing positive electrode applied portion and negative electrode applied portion. The portion 16 functioning as the holding portion 19 has a rectangular shape with a width dimension Wk and a height dimension Hk. A relationship Wk≥We is established between the width dimension Wk and the width We of the opposing positive electrode applied portion and negative electrode applied portion. A material of the insulating sheet is not limited, and may employ an insulating resin, such as polyethylene-based resin, acrylic-based resin, or the like. The thickness of the insulating sheet is not particularly limited, but the insulating sheet preferably has a thickness of several percent of that of the flat wound group.

Figure 9:
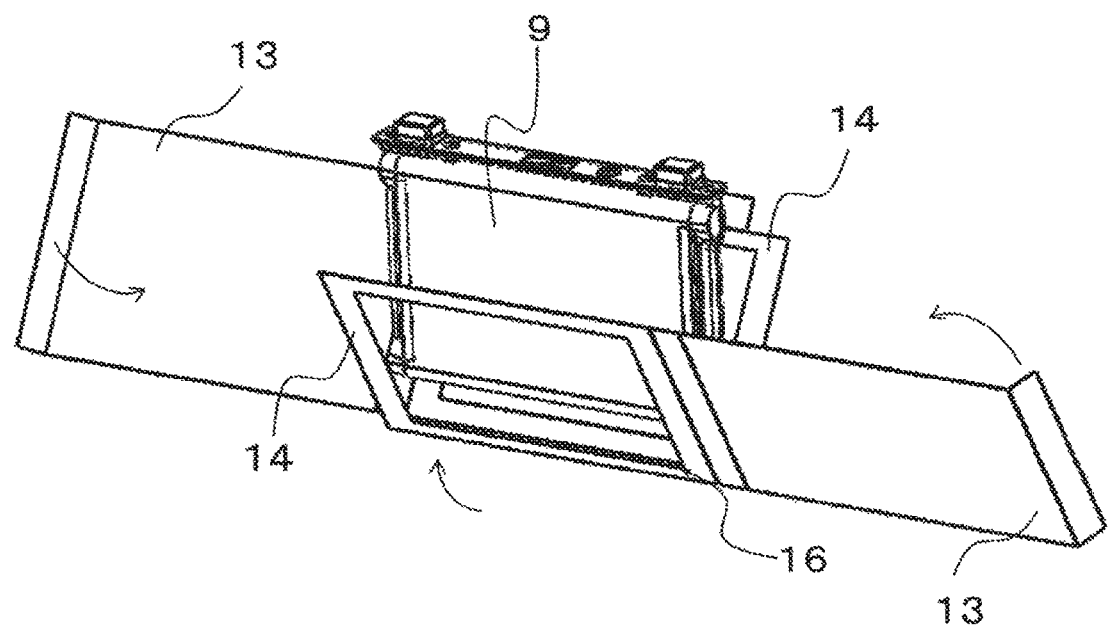
FIG. 9 illustrates a procedure surrounding a flat wound group 18 by the insulating sheet 19b having a holding portion 19.

FIG. 9 illustrates a procedure surrounding the flat wound group 18 by the insulating sheet 19b having a holding portion 19. The outside opposing portions 13 are bent in a direction indicated by arrows in FIG. 9 so that the inside wide portions 14 are positioned on the inside.

Figure 10:
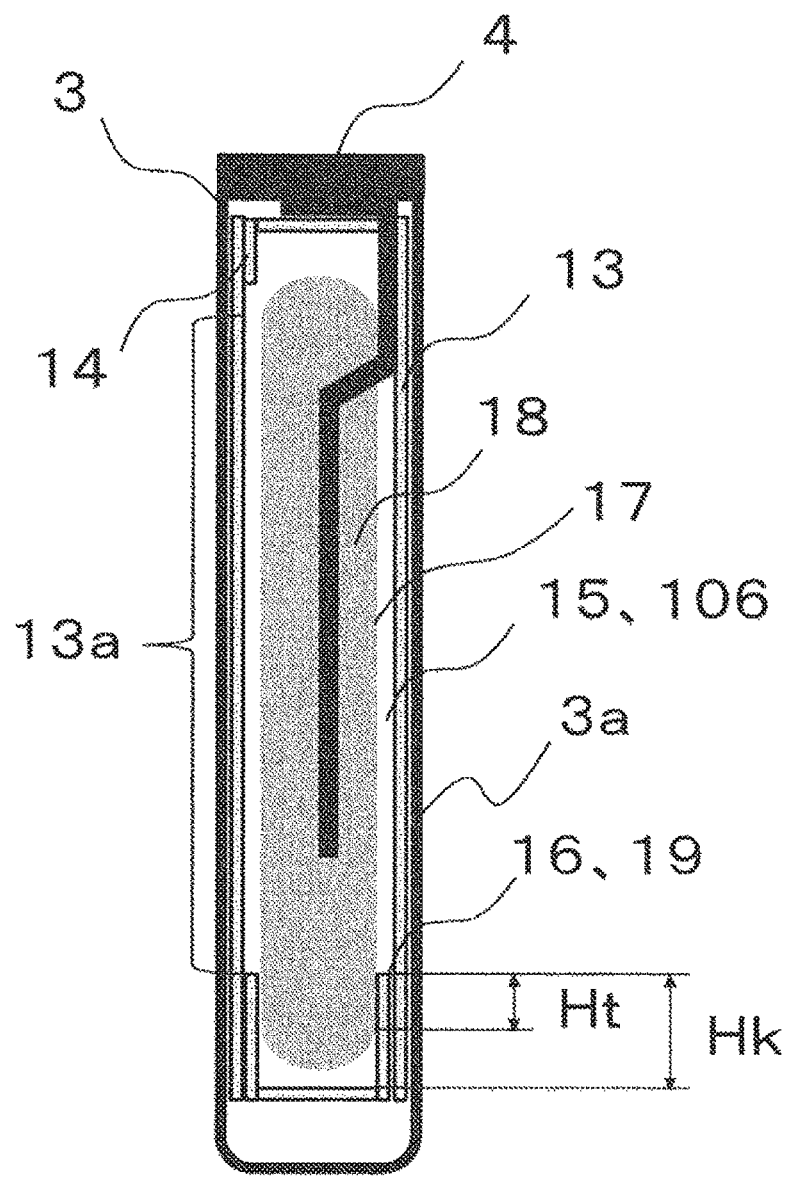
FIG. 10 is a schematic diagram illustrating of a cross-section of B of FIG. 7 with cross-sections of a cell case 3 and a case lid 4.

FIG. 10 is a schematic diagram illustrating of a cross-section of B of FIG. 7 with cross-sections of the cell case 3 and the case lid 4. Gaps 106 are formed between the flat portion 17 and the inner wall of the cell case 3 by a hole 15 of the insulating sheet 19b having a holding portion 19.

Each opposing surface 13a of the insulating sheet 19b positioned toward the flat wound group 18 opposes the flat portion 17 through the corresponding gap 106. In the insulating sheet 19b, the opposing surface 13a is recessed toward the inside wide portion 14. The opposing surface 13a opposing the flat portion 17 is positioned outside the flat wound group in a thickness direction, relative to a contact portion between the holding portion 19 and the flat portion 17. Therefore, a gap 106 is naturally formed between the flat portion 17 and the inner wall of the cell case 3. Accordingly, the gap is formed between the opposing surface 13a and the inner wall of the cell case 3.

Of the inside wide portion 14, a portion positioned between the flat portion 17 of the flat wound group 18 near the cell case bottom, and an inner wall of the cell case is functioned as the holding member 19 (the portion 16 functioning as the holding portion 19). The portion 16 functioning as the holding portion 19 projects toward the opposing surface 13a, and thus, even when the gap is provided between the opposing surface 13a and the cell case, the flat wound group 18 is fixed by the holding portions 19.

The holding portion 19 is provided between the lower side of the flat portion 17 (near the cell case bottom) and the inner wall of the cell case 3. In the second example, each outside wide portion 13 is further positioned between the corresponding holding portion 19 and the cell case 3. In FIG. 10, the holding portion 19 is provided over the length of Hk, but may be provided only at a position of Ht.

Owing to the holding portion 19 provided as described in the second example, the insulating sheet 19b having a holding portion 19 can be used eliminating the need for another member functioning as the holding portion 19 as described in the first example, and production cost can be reduced.

The structure of the module using the secondary cell 1 according to the second example can employ a structure similar to that of the first example as illustrated in FIGS. 5 and 6.

THIRD EXAMPLE

Figure 11:
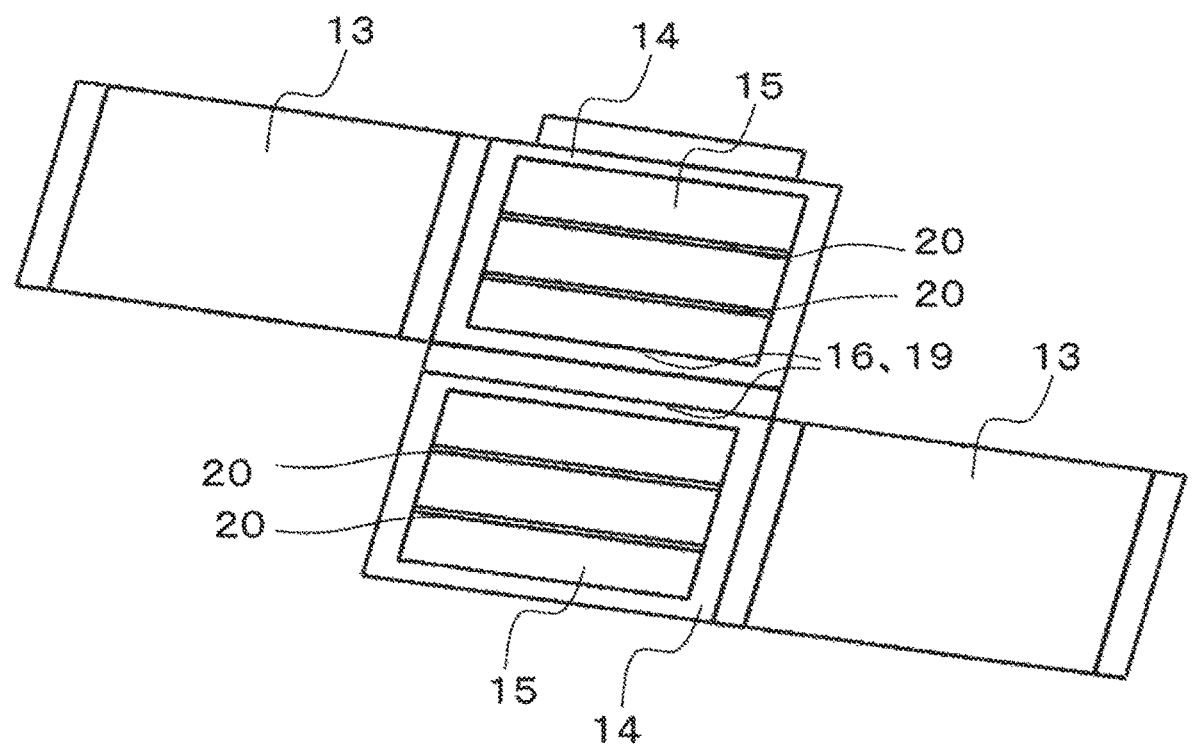
FIG. 11 illustrates an insulating sheet 13 having a capturing/holding portion 20.

In a third example, an insulating sheet 13 having a capturing/holding portion 20 is used (FIG. 11).

This insulating sheet is obtained by adding the capturing/holding portions 20 to the insulating sheet 19b of FIG. 8 used in the second example.

FIG. 11 is a perspective view of the insulating sheet 19c according to the third example.

The insulating sheet 19c according to the third example includes the capturing/holding portions 20 in a hole 15. Owing to the capturing/holding portions 20, the flat wound group 18 is further firmly fixed, in comparison with those in the first and second examples. Therefore, a configuration stabler with respect to vibration can be provided. Meanwhile, the flat wound group 18 is fixed further firmly by the capturing/holding portion 20 in comparison with those in the first and second examples, the flat wound group 18 increases the possibility of electrolyte depletion than in the first and second examples, but the hole 15 is provided and the possibility of electrolyte depletion can be reduced, in comparison with a secondary cell having an entirely fixed flat portion 17.

Here, the capturing/holding portions 20 are not limited to a ladder shape as illustrated in FIG. 11. For example, the capturing/holding portion 20 may be provided in a ladder shape or x shape.

Figure 12:
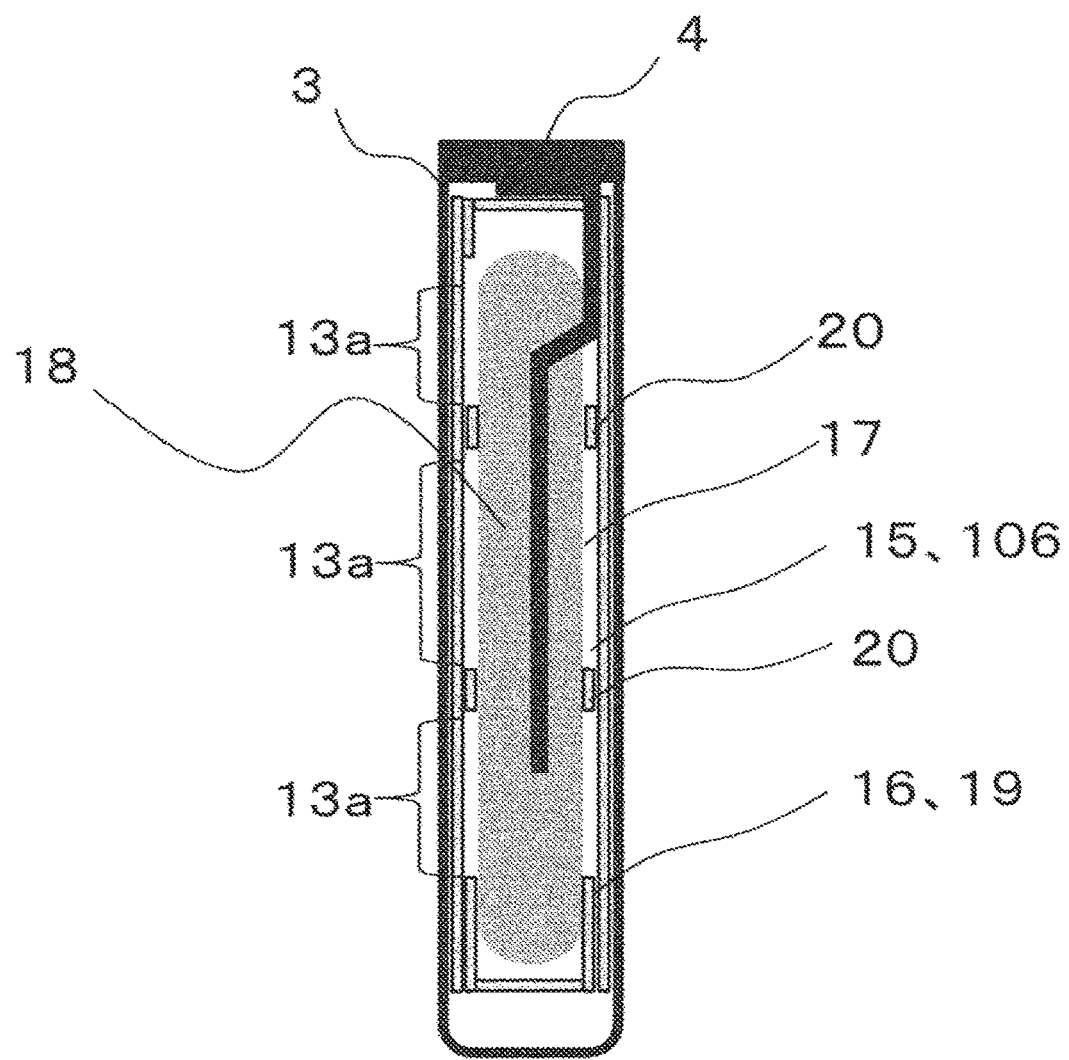
FIG. 12 is a cross-sectional view of a secondary cell 1 according to a third example.

FIG. 12 is a cross-sectional view of the secondary cell 1 according to the third example. FIG. 12 illustrates a similar cross-sectional position as in the first example. Each capturing/holding portion 20 is provided between the flat portion 17 and the cell case 3. Even when the capturing/holding portion 20 is provided, a gap 106 is maintained somewhere between the flat portion 17 and the cell case 3. Therefore, the gap 106 can prevent electrolyte depletion of the flat wound group.

Figure 13:
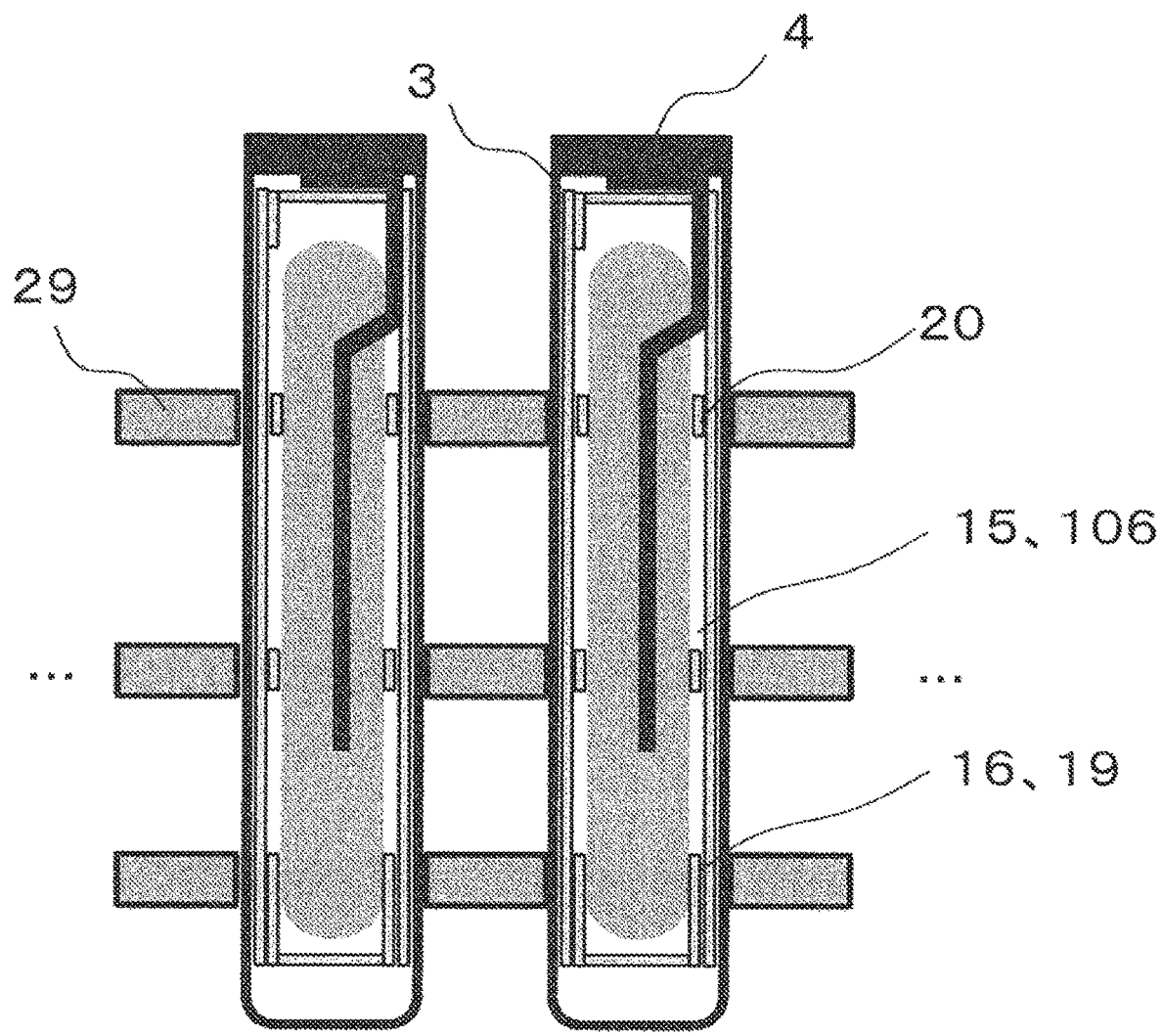
FIG. 13 is a schematic cross-sectional view of an example of a module structure using the secondary cell 1 according to the third example.

FIG. 13 is a schematic cross-sectional view of an example of a module structure using the secondary cell 1 according to the third example.

As in FIG. 6 of the first example, the connectors 29 are provided at positions on surfaces of the cell cases 3 opposing the holding portions 19 and the capturing/holding portions 20, and thus, the secondary cells 1 can be efficiently secured.

The connector 29 may have a shape configured to hold the whole outer surfaces of the secondary cells 1, as in FIG. 5 of the first example, in addition to the shape as illustrated in FIG. 13. Even when the cell cases 3 are wholly held from outside, the holding portions 19 can maintain the gaps 106.

A structure for holding the flat wound group 18 at a position other than the holding portion 19, such as the capturing/holding portion 20, can be also used in the structures have been described in the first and second examples, or structures as described later in fourth and fifth examples, in addition to the structure described in the third example. In the first example, a plurality of the insulating tapes can be provided at the flat wound group to achieve this structure.

FOURTH EXAMPLE

In a fourth example, the holding portion 19 is provided on the cell case 3.

Figures 14A, 14B:
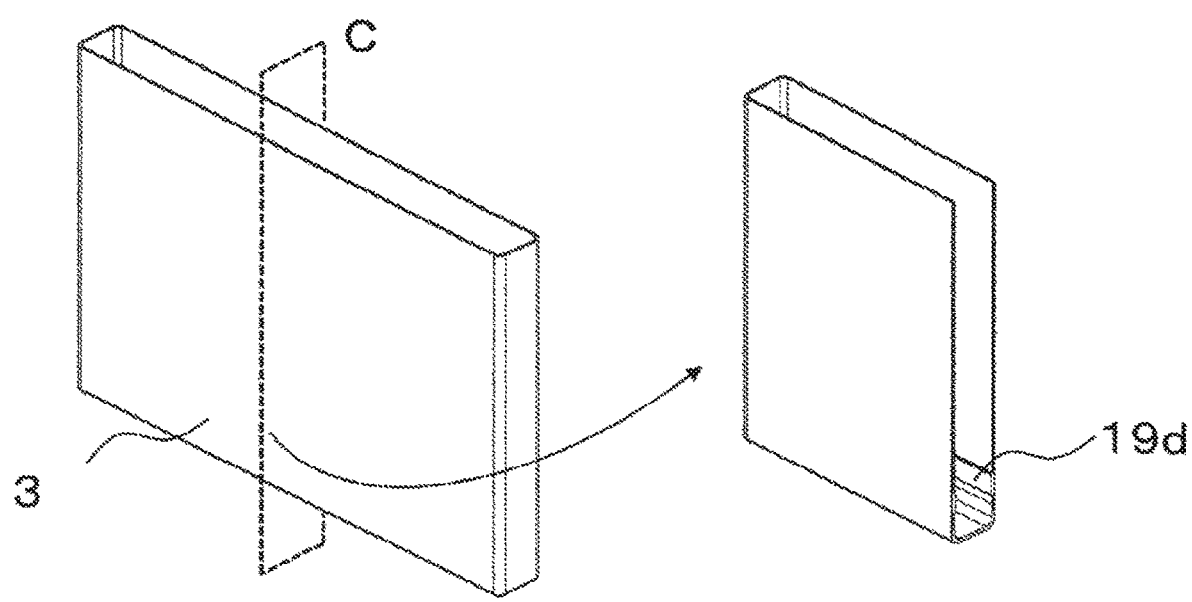
FIG. 14A is a perspective view of a cell case 3 having a holding portion 19 (holding portion 19d)
FIG. 14B is a cross-sectional view of the cell case 3 taken along a cut plane C.

In FIG. 14, (a) of FIG. 14 is a perspective view of the cell case 3 having holding portions 19 (holding portions 19d), and (b) of FIG. 14 is a cross-sectional view of the cell case 3 taken along a cut plane C.

The cell case 3 has the holding portions 19d on an inner wall. Each of the holding portions 19d is provided at a position of the inner wall of the cell case 3, near the cell case bottom. The holding portion 19d is provide at a position near the cell case bottom, and thus, when the flat wound group 18 is inserted into the cell case 3, the cell case bottom of the flat portion 17 of the flat wound group 18 is fixed, and vibration is efficiently reduced.

Figure 15:
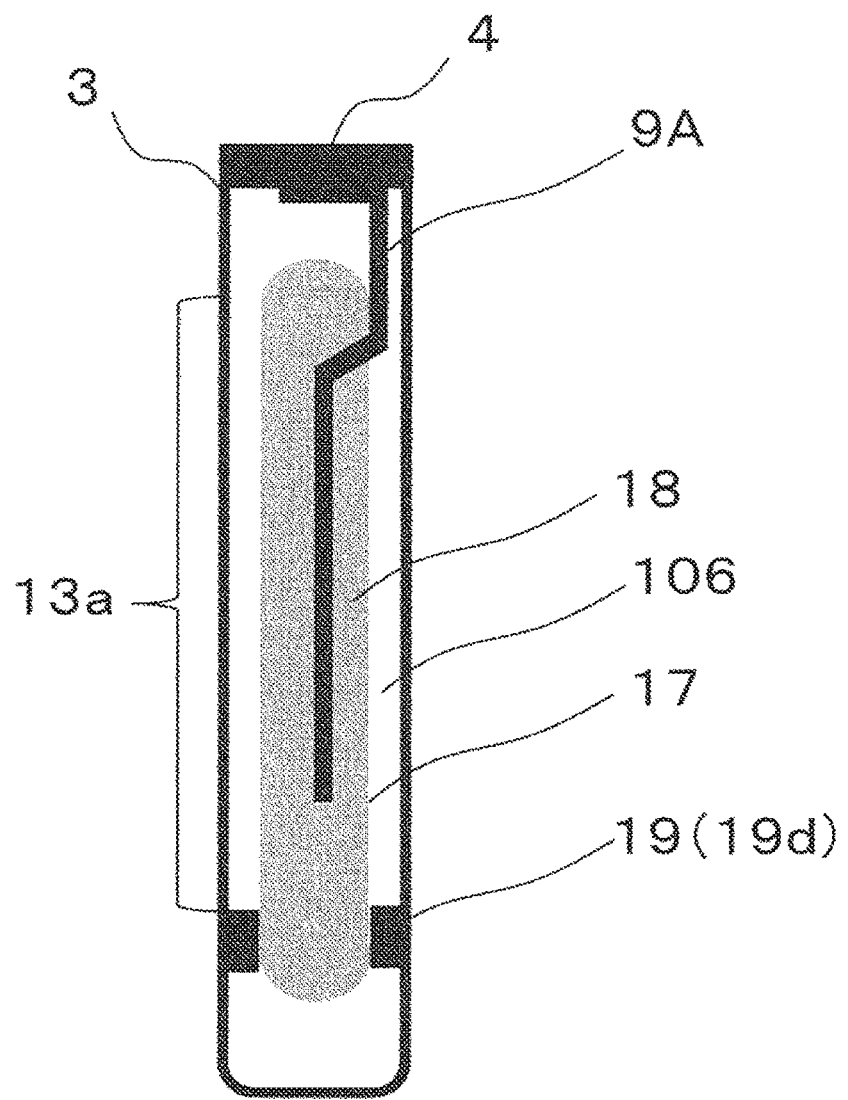
FIG. 15 is a cross-sectional view of a secondary cell 1 according to a fourth example.

FIG. 15 is a cross-sectional view of the secondary cell 1 according to the fourth example. FIG. 15 illustrates a similar cross-sectional position as in the first example. The holding portions 19d provided, as the holding portion, at the cell case 3 is provided between the flat portion 17 and the cell case 3. The opposing surface 13a opposing the flat portion 17 is positioned outside the flat wound group in a thickness direction, relative to a contact portion between the holding portion 19 and the flat portion 17. Therefore, gaps 106 are generated between the flat portion 17 and the inner wall of the cell case 3.

Since the holding portion is provided at the cell case 19 as described in the fourteenth example, the flat wound group or the insulating sheet does not need to be provided with a holding portion, and thus, a structure in the battery cell can be simplified.

The structure of the module using the secondary cell according to the fourth example can employ a structure similar to that in the first example.

FIFTH EXAMPLE

Figures 16A, 16B:
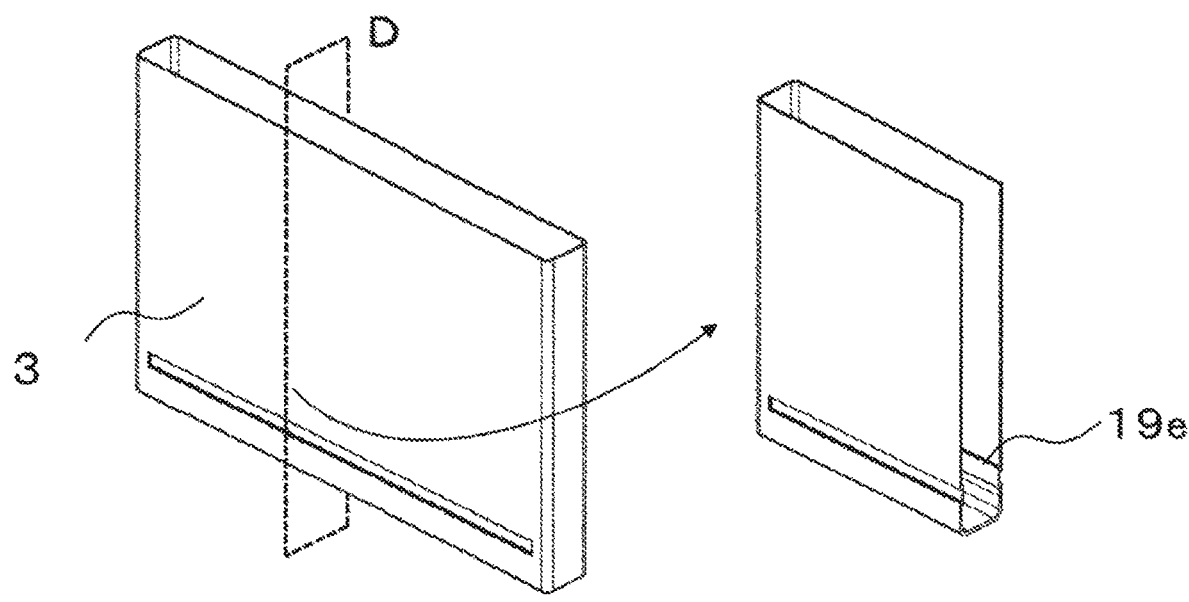
FIG. 16A is a perspective view of a cell case 3 having a holding portion 19 (holding portion 19e)
FIG. 16B is a cross-sectional view of the cell case 3 taken along a cut plane D.

In the fourth example, as illustrated in FIG. 16, the cell case 3 can be partially pressed inward to make abutment on the lower portion of the flat portion 17 of flat wound group to achieve a holding portion 19e.

In FIG. 16, (a) of FIG. 16 is a perspective view of the cell case 3 having the holding portions 19 (holding portion 19e), and (b) of FIG. 16 is a cross-sectional view of the cell case 3 taken along a cut plane D.

Figure 17:
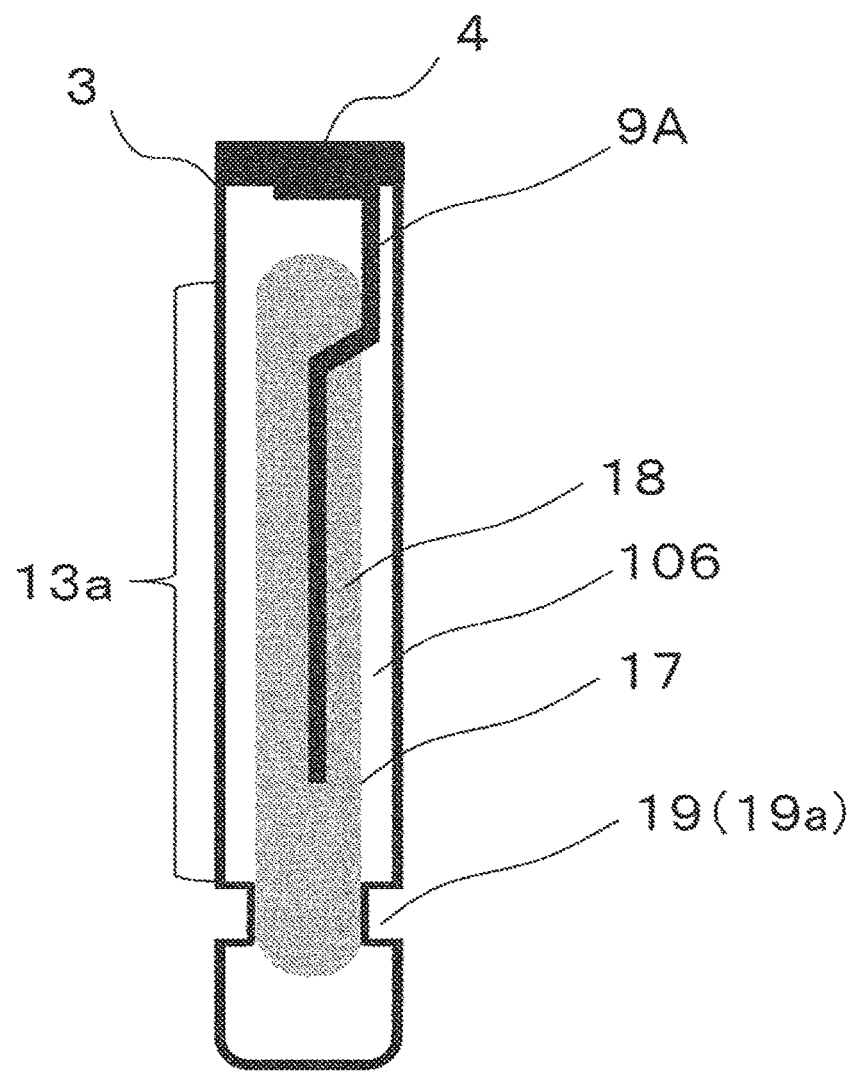
FIG. 17 is a cross-sectional view of a secondary cell 1 according to a fifth example.

FIG. 17 is a cross-sectional view of the secondary cell 1 according to a fifth example. FIG. 17 illustrates a similar cross-sectional position as in the first example. The holding portion 19e provided, as the holding portion, at the cell case 3 is provided between the flat portion 17 and the cell case 3.

Figure 18:
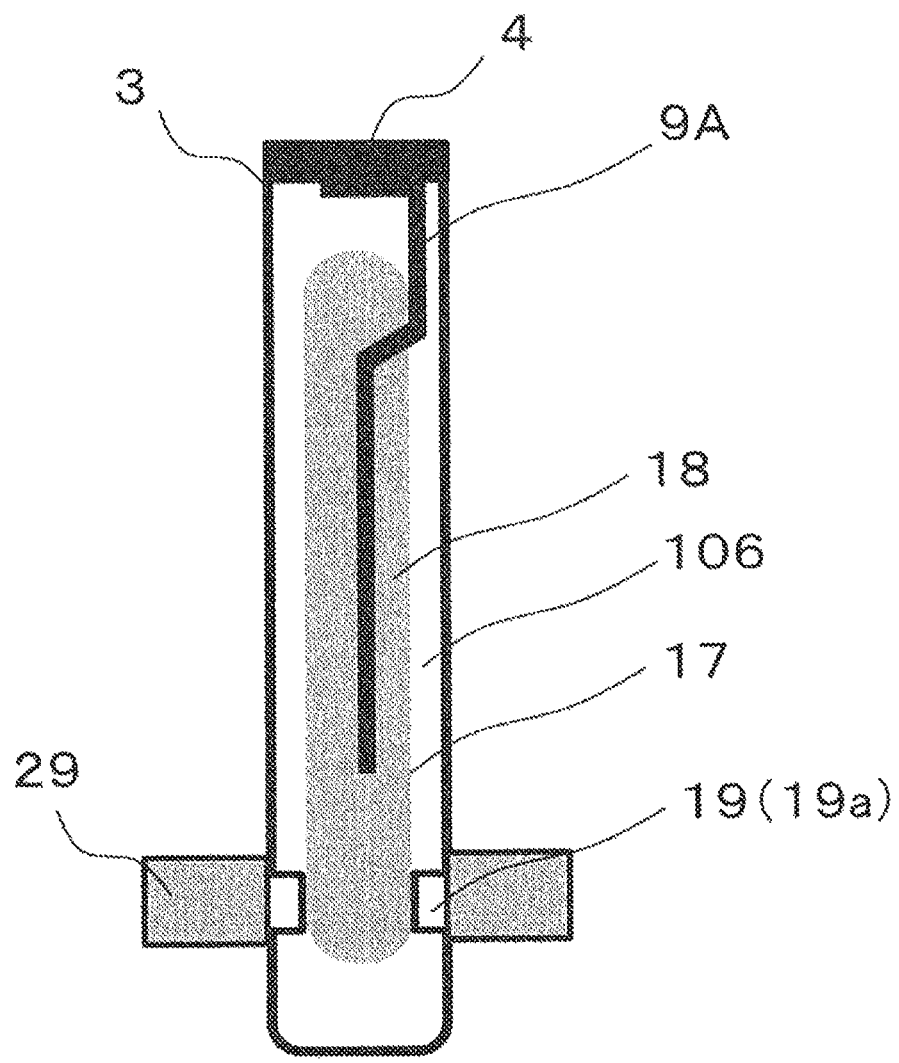
FIG. 18 illustrates a position of a connection member 29 where a module uses the secondary cell 1 according to the fifth example.

FIG. 18 illustrates a position of the connection member 29 where a module uses the secondary cell 1 according to the fifth example. The connection members 29 can be provided at positions opposing the holding portions 19. In FIG. 18, a space is formed between the corresponding holding portion 19 and connection member 29, but the space may be filled or not.

The present invention has been described above with reference to examples, but the secondary cell according to the present invention can be used as a secondary cell mounted to a car battery system applied to a hybrid car, a zero-emission electric vehicle, or the like using a motor as a drive source. Furthermore, a battery system including the secondary cell according to the present invention is not limited to the above application. A battery system including the secondary cell according to the present invention can be also used as a power storage system for charging a battery with power generated by solar power generation, wind power generation, or the like, for power storage, regardless of home use, business use, and industrial use, as a power storage system for charging a battery using midnight electric power, for power storage, or as a power storage system usable in a place, other than on earth, such as a space station, a space ship, or the like. Furthermore, a battery system including the secondary cell according to the present invention can be applied for industrial use, such as a medical device, a construction machine, a power storage system, an elevator, or an unmanned ground vehicle, or for a mobile body, such as a golf cart or a turret truck.

REFERENCE SIGNS LIST 1 secondary cell
2 insulating sheet
3 cell case 3a opposing surface
4 case lid
5 gas discharge valve
6 solution inlet
7 terminal connection portion
7A positive electrode external terminal
7B negative electrode external terminal
8 metal cap
9A positive electrode current collector
9B negative electrode current collector
105 gasket
106 gap
negative electrode sheet
10a negative electrode applied portion
10b negative electrode unapplied portion
11 positive electrode sheet
11a positive electrode applied portion
11b positive electrode unapplied portion
12 separator
13 outside wide portion
13a opposing surface
14 inside wide portion
15 hole
16 portion functioning as holding portion 19
17 flat portion of flat wound group
17b curved portion of flat wound group
18 flat wound group
19 holding portion
19a insulating member
19b insulating sheet having holding portion
19c insulating sheet according to third example
19d holding portion (in cell case)
19e holding portion (in cell case)
20 capturing/holding portion
29 connector
Hh height dimension of hole 15
Hk height dimension of holding portion 9
Ht length dimension of a portion at lower portion of flat portion 17 of flat wound group, abutting on holding portion 19 positioned
We width of opposing positive electrode applied portion and negative electrode applied portion
Wh width dimension of hole 15
Wk width dimension of holding portion 19

The invention claimed is:

1. A secondary cell comprising:
a flat wound group including a flat portion and a curved portion;
a cell case; and
a case lid that is configured to seal the cell case, wherein
the flat wound group comprises an active material mixture applied portion and an insulating sheet insulating the flat wound group and the cell case from each other, and is housed in the cell case,
the case lid supports the flat wound group on one end side of the flat wound group,
a gap is formed between the curved portion and the cell case,
the insulating sheet is formed by plurality of superposed insulating layers including at least an outside wide layer and an inside wide layer on the flat portion,
the flat wound group is connected to the case lid through positive and negative current collectors, and
the inside wide layer is formed of: i) a hole constituting a gap between the flat portion and the outside wide layer, and ii) a portion that is configured as a holding portion for the flat wound group between the flat portion on the other end side of the flat wound group and the outside wide layer.

2. The secondary cell according to claim 1, wherein the holding portion is provided on both sides of the flat wound group.

3. The secondary cell according to claim 1, wherein the holding portion is provided between the cell case and the active material mixture applied portion.

4. The secondary cell according to claim 3, wherein the insulating sheet positioned between the cell case and the flat wound group has the holding portion.

5. The secondary cell according to claim 4, wherein the holding portion has a structure in which a plurality of insulating layers are superposed to form the insulating sheet.

6. The secondary cell according to claim 3, wherein the holding portion is formed to project from the cell case.

7. The secondary cell according to claim 1, wherein the holding portion is a holding portion held between a wide surface of the cell case near a cell case bottom and the flat wound group.

8. The secondary cell according to claim 7, wherein the holding portion is an insulating tape or a sheet-shaped member fixed to the flat wound group.

9. The secondary cell according to claim 7, wherein the holding portion is fixed to the cell case.

10. The secondary cell according to claim 1, wherein the secondary cell has a capturing/holding portion, and the flat wound group is held by a plurality of the holding portions and a plurality of the capturing/holding portions.

* * * * *